(12) United States Patent
Shakibapour (10) Patent No.: US 9,217,332 B2
(45) Date of Patent: Dec. 22, 2015

(54) UNI-DIRECTIONAL AXIAL TURBINE BLADE ASSEMBLY

(71) Applicant: Mohammad Ismail Abbassi Shakibapour, Santa Monica, CA (US)

(72) Inventor: Mohammad Ismail Abbassi Shakibapour, Santa Monica, CA (US)

( * ) Notice: Subject to any disclaimer, the term of this patent is extended or adjusted under 35 U.S.C. 154(b) by 686 days.

(21) Appl. No.: 13/669,081

(22) Filed: Nov. 5, 2012

(65) Prior Publication Data

US 2014/0127019 A1    May 8, 2014

(51) Int. Cl.
*F03D 1/06* (2006.01)
*F03B 3/12* (2006.01)
*F01D 5/14* (2006.01)
*F03B 13/26* (2006.01)

(52) U.S. Cl.
CPC .............. *F01D 5/141* (2013.01); *F03D 1/0633* (2013.01); *F03B 13/264* (2013.01); *F05B 2210/404* (2013.01); *Y02T 50/673* (2013.01)

(58) Field of Classification Search
CPC ......... Y02E 10/38; Y02E 10/28; Y02E 10/32; F03B 13/26; F03B 13/264; F03B 3/04; F03B 3/12; F03B 3/126; F05B 2210/404; F05B 2240/301; F03D 1/06; F03D 1/0633; F03D 1/0641
USPC .................................. 416/243, 223 R, DIG. 2
See application file for complete search history.

(56) References Cited

U.S. PATENT DOCUMENTS

| | | | | |
|---|---|---|---|---|
| 3,410,535 A * | 11/1968 | Balassa ............ | B01F 15/00012 | 366/207 |
| 3,972,646 A * | 8/1976 | Brown ............... | B63H 1/26 | 415/119 |
| 4,368,007 A * | 1/1983 | Ely .................. | F03D 1/0608 | 416/121 |
| 4,447,740 A * | 5/1984 | Heck ................ | F03B 13/22 | 290/53 |
| 4,545,726 A * | 10/1985 | Holliger ............ | F01D 5/141 | 415/191 |
| 4,822,246 A * | 4/1989 | Hsu ................. | F04D 29/384 | 416/175 |
| 6,065,936 A | 5/2000 | Shingai et al. | | |
| D489,446 S * | 5/2004 | Hoshina ........... | D23/413 | |
| 7,018,106 B2 | 3/2006 | Okada | | |
| 7,147,428 B2 * | 12/2006 | Lamont ............ | F03B 3/04 | 290/54 |
| 2005/0285407 A1 * | 12/2005 | Davis ............... | F03B 3/128 | 290/54 |
| 2007/0248466 A1 * | 10/2007 | Lotrionte ......... | F03B 3/04 | 416/223 R |
| 2007/0284884 A1 * | 12/2007 | Stothers ........... | F03B 3/04 | 290/54 |
| 2014/0017065 A1 * | 1/2014 | Dale ................ | F03B 3/04 | 415/68 |

FOREIGN PATENT DOCUMENTS

GB           2300886 A  *  11/1996  ............. F03B 3/126

* cited by examiner

*Primary Examiner* — Dwayne J White
*Assistant Examiner* — Joshua R Beebe
(74) *Attorney, Agent, or Firm* — Michael N. Cohen; Cohen IP Law Group, P.C.

(57) ABSTRACT

A uni-directional axial turbine blade assembly comprises a central disc member coupled to an elongated shaft of a motor or generator, a rotational support member mounted on outer circumference of the central disc member, an outer ring mounted on outer circumference of the rotational support member and a plurality of blade members spaced equidistantly, extending radially outward from the outer ring. Each blade member includes a straight leading edge, a curved trailing edge, an exterior surface including a first region having a curved surface, a second region having a flat surface and a convex surface extending from the flat surface and terminating to a radially inward portion and an interior surface including a third region having a concave surface. The preferred embodiment renders the formation of a unique blade configuration that facilitates uni-directional rotation of the blade assembly irrespective of changes in flow direction of fluid.

20 Claims, 9 Drawing Sheets

UNI-DIRECTIONAL AXIAL TURBINE BLADE ASSEMBLY

CROSS-REFERENCE TO RELATED APPLICATIONS

Not Applicable.

STATEMENT REGARDING FEDERALLY SPONSORED RESEARCH AND DEVELOPMENT

Not Applicable.

FIELD OF THE DISCLOSURE

This embodiment relates to turbine blade assemblies, and more particularly to a uni-directional axial turbine blade assembly used for propellers.

DISCUSSION OF RELATED ART

The uni-directional axial turbine blade assembly is widely used in propeller fans, impellers, wind turbines, hydro-tidal wave energy generators, hydro turbines, any industries involving rotation devices and the like. The uni-directional axial turbine blade assembly provides unidirectional rotation from bidirectional, or reversible fluid, or shifting wind directions. Generally, the unidirectional axial turbine blade assembly comprises a small number of blades arranged radially outward from a hub and is driven by horizontal shaft. This type of assembly can be used in cases where the blades rotate in one direction regardless of the direction in which the fluid or air flows. Currently used uni-directional axial turbine blade assemblies have less efficiency, because the effective surface area of the blades is limited to tips of the blades, where the linear velocity is greatest.

U.S. Pat. No. 7,018,166 issued to Gaskell on Mar. 28, 2006 provides a duct assembly comprising an axial flow free rotor and a circular duct on the upstream side. The duct is adapted to separate a fluid stream into an inner stream within the duct and an outer stream outside the duct. The rotor contains a hub with a plurality of arms extending radially outward. Each arm comprises a radially outer portion and a radially inner portion. The outer portions being responsive to the outer stream to cause the free rotor to rotate uni-directionally in use; and the inner portions defining extraction means adapted to draw fluid from the inner stream towards the free rotor from the upstream side. However, the duct assembly requires an additional protective duct or a channel that diverges in the flow direction of the uni-directional fluid stream towards the free rotor. The duct is also necessary to enhance the efficiency of energy conversion, and to improve the efficiency of air extraction.

Similarly, U.S. Pat. No. 6,065,936 issued to Shingai on May 23, 2000, describes a compact, flat axial fan which is not limited by the shape of an incorporated rotor magnet and ensures a sufficiently large air flow and wind pressure. The slide (under) piece of a mold that forms the under-molding portions of the vanes of the impeller of the axial fan is pulled out while being twisted (while performing a helical motion) in the direction of central axis of the base portion of the impeller. The mold can be formed simply to realize a multi-cavity mold, and the vanes can be formed into an ideal form by setting vane angles depending on different rotating peripheral velocities of the vanes. The air can be supplied form the under-molding portions of the vanes to the vanes on the outer side during the rotation of the impeller. The axial fan comprises an impeller integrally formed by resin molding, with a plurality of vanes extending from the cylindrical body to which a rotary axial support shaft body is formed at a center of rotation. However, the axial fan can only obtain a sufficiently large air flow and wind pressure when the main vanes are open to air flow from one direction and the sub vanes are open to air flow from the opposite direction. Therefore, the axial fan cannot provide an efficient uni-directional rotation regardless of the change in flow direction.

In addition, U.S. Pat. No. 5,451,137 issued to Gorlov on Sep. 19, 1995 discloses a reaction turbine capable of providing high speed unidirectional rotation under a reversible ultra low head pressure and/or high velocity fluid flow. The turbine comprises a working wheel with a plurality of airfoil-shaped blades mounted transversely in the direction of fluid flow for rotation in a plane parallel to the fluid flow. The blades are arranged in a helical configuration that ensures that some of the blades are always positioned perpendicular to the fluid pressure. The skewed leading edges reduce resistance to the turbine rotation. A channel have a curved configuration with opposed changes in elevation or bulges directed towards the center of the turbine in a plane parallel to the flow of fluid to optimize the angle of attack of the fluid on the blades. The turbine is suitable for use in hydro-pneumatic, hydro, wind, or wave power systems. However, the reaction turbine has a complicated structural arrangement of blades with additional attachments to provide a uni-directional rotation. Thus, the complicated construction leads to increased cost of manufacturing and design complexity.

In light of the foregoing, there is a need for an economical, uniformly rotational, simple, uni-directional turbine that can operate at high speeds. Such a needed tool would be easily configured to achieve two different designs. Such a uni-directional axial turbine blade assembly does not need a protective tunnel or duct. Further, the present embodiment would increase the power of a rotational shaft when two uni-directional axial turbine blade assemblies are joined together. Such a unique design of the uni-directional axial turbine blade assembly provides efficient uni-directional rotation irrespective of changes in flow direction of fluid. The present embodiment accomplishes these objectives.

SUMMARY OF THE DISCLOSURE

The present embodiment is a uni-directional axial turbine blade assembly used for propellers. The uni-directional axial turbine blade assembly comprises a central disc member coupled to an elongated shaft of a motor or generator, a rotational support member mounted on outer circumference of the central disc member, an outer ring mounted on outer circumference of the rotational support member and a plurality of blade members spaced equidistantly, extending radially outward from the outer ring. The central disc member is coupled to the elongated shaft at a central axis of rotation. The rotational support member and the outer ring are oriented coaxially with the central disc member.

Each of the plurality of blade members includes an exterior surface, an interior surface, a leading edge and a trailing edge. The leading edge is straight and the trailing edge is curved. The exterior surface includes a first region having a curved surface along the leading edge and a second region having a flat surface along the trailing edge and a convex surface extending from the flat surface along the trailing edge and terminating to a radially inward portion. The flat surface of the second region is attached to the outer ring proximate the central disc member. The interior surface of each of the plurality of blade members includes a third region having a concave surface proximate the trailing edge. The radially inward portion is extended transverse to axial flow of fluid and axially parallel to the central axis of rotation to define a pocket like structure. The curved surface of the first region along the straight leading edge flips up along the entire length of the straight leading edge.

The flat surface of the second region having a high pressure level causes the uni-directional axial turbine blade assembly to rotate towards the first region having low pressure level. The concave surface of the third region having a high pressure level causes the uni-directional axial turbine assembly to move away from the equidistant space having a low pressure level between the plurality of blade members.

The curved surface of the first region along the straight leading edge, the flat surface of the second region along the curved trailing edge and the concave surface of the third region proximate the trailing edge of each of the plurality of blade members oriented in relation to the central disc member renders the formation of a unique blade configuration that facilitates uni-directional rotation of the uni-directional axial turbine blade assembly irrespective of changes in flow direction of fluid.

Each of the plurality of blade members can be manufactured with the straight leading edge on right side of each of the plurality of blade members of the uni-directional axial turbine fluid assembly to achieve a counter-clockwise spinning from either direction. In one embodiment, each of the plurality of blade members can be manufactured with the straight leading edge on left side of each of the plurality of blade members of the uni-directional axial turbine fluid assembly to achieve a clockwise spinning from either direction.

The present embodiment provides an economical, uniformly rotational, simple, uni-directional turbine that can operate at high speeds. Such a needed tool would be easily configured to achieve two different designs. Such a uni-directional axial turbine blade assembly does not need a protective tunnel or duct. Further, the present embodiment would increase the power of a rotational shaft when two uni-directional axial turbine blade assemblies are joined together. Such a unique design of the uni-directional axial turbine blade assembly provides efficient uni-directional rotation irrespective of changes in flow direction of fluid. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

The following describes example embodiments in which the present invention may be practiced. This invention, however, may be embodied in many different ways, and the description provided herein should not be construed as limiting in any way. Among other things, the following invention may be embodied as methods or devices. As such, the present invention may take the form of an entirely hardware embodiment, an entirely software embodiment, or an embodiment combining software and hardware aspects. The following detailed descriptions should not be taken in a limiting sense.

In this document, the terms "a" or "an" are used, as is common in patent documents, to include one or more than one. In this document, the term "or" is used to refer to a nonexclusive "or," such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Figure 1:
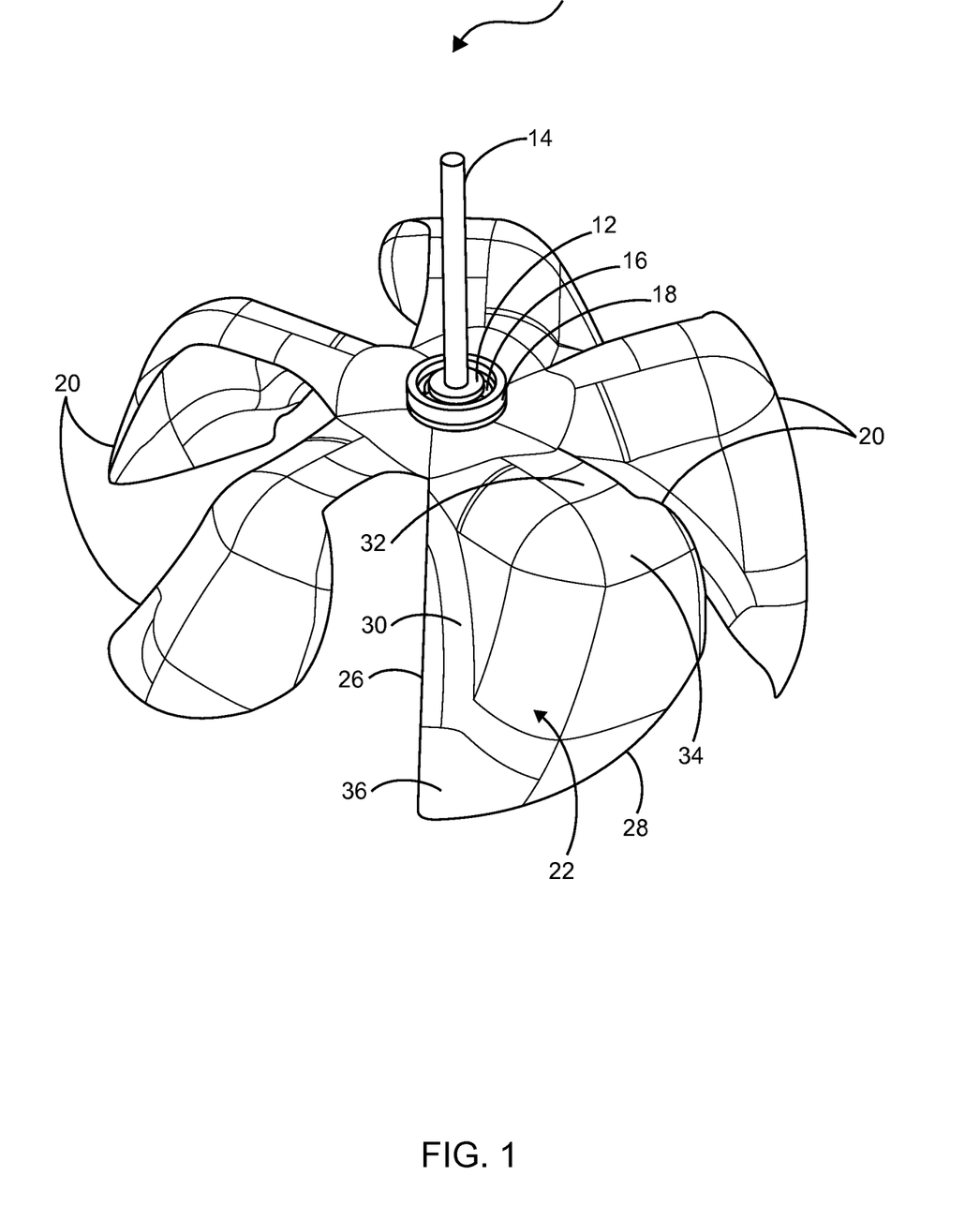
FIG. 1 is an exterior perspective view of a uni-directional axial turbine blade assembly in accordance with a preferred embodiment of the present invention.

Referring to FIG. 1, an exterior perspective view of a uni-directional axial turbine blade assembly 10 in accordance with a preferred embodiment of the present invention is illustrated. The uni-directional axial turbine blade assembly 10 comprises a central disc member 12 coupled to an elongated shaft 14 of a motor or generator (not shown), a rotational support member 16 mounted on outer circumference of the central disc member 12, an outer ring 18 mounted on outer circumference of the rotational support member 16 and a plurality of blade members 20 spaced equidistantly, extending radially outward from the outer ring 18. The central disc member 12 is coupled to the elongated shaft 14 at a central axis of rotation. The rotational support member 16 and the outer ring 18 are oriented coaxially with the central disc member 12.

Figure 2:
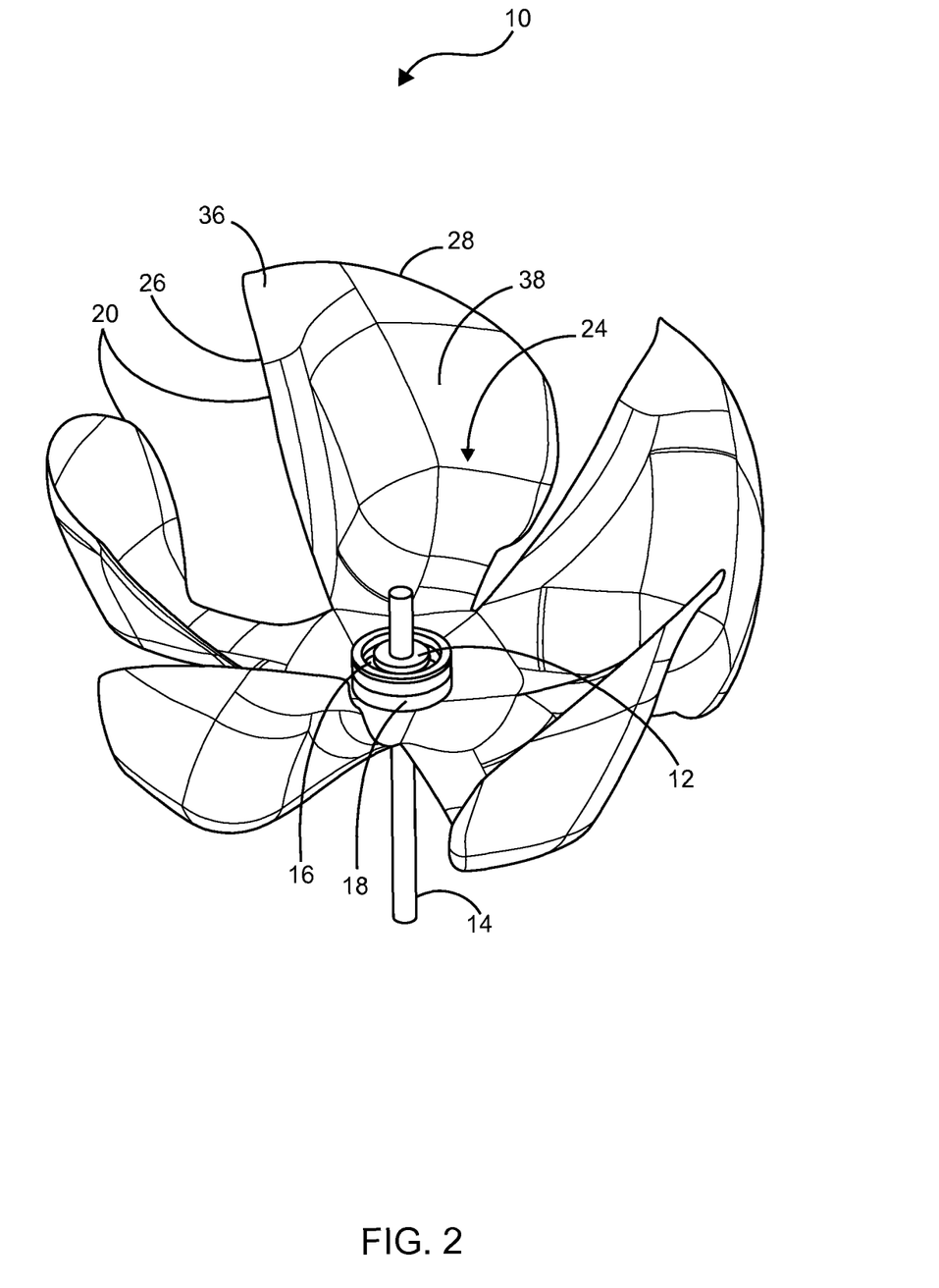
FIG. 2 is an interior perspective view of the uni-directional axial turbine blade assembly in accordance with a preferred embodiment of the present invention.

Each of the plurality of blade members 20 includes an exterior surface 22, an interior surface 24 (FIG. 2), a leading edge 26 and a trailing edge 28. The leading edge 26 is straight and the trailing edge 28 is curved. The exterior surface 22 includes a first region 30 having a curved surface along the leading edge 26 and a second region 32 having a flat surface along the trailing edge 28 and a convex surface 34 extending from the flat surface along the trailing edge 28 and terminating to a radially inward portion 36. The flat surface of the second region 32 is attached to the outer ring 18 proximate the central disc member 12. The radially inward portion 36 is extended transverse to axial flow of fluid and axially parallel to the central axis of rotation to define a pocket like structure (as shown in FIG. 2). The rotational support member 16 is selected from a group consisting of a flange with holes.

As shown in FIG. 2, an interior perspective view of the uni-directional axial turbine blade assembly 10 is illustrated. The interior surface 24 of each of the plurality of blade members 20 includes a third region 38 having a concave surface proximate the trailing edge 28. Each of the plurality of blade members 20 is thicker closer to the central disc member 12 and thinner at outer edge thereof.

Figure 3A:
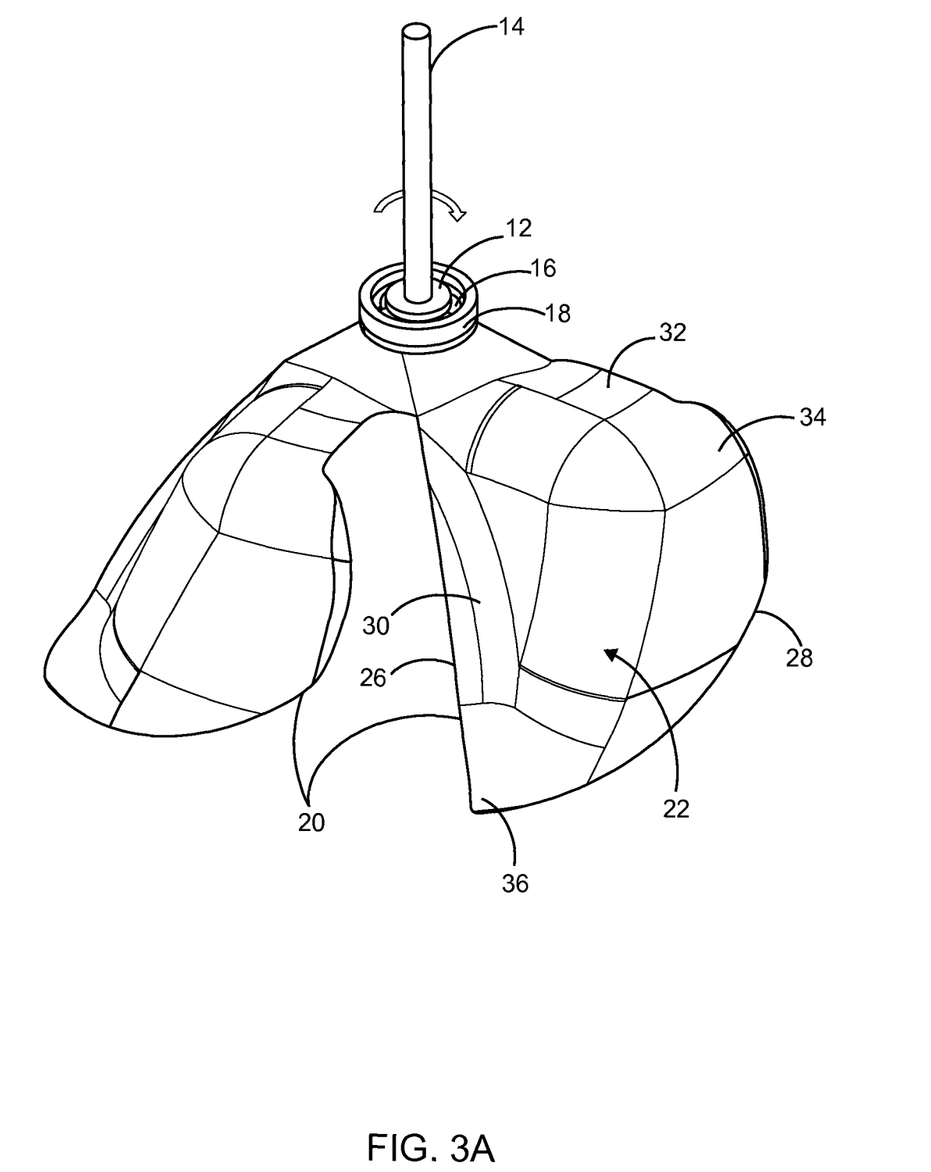
FIGS. 3A-3C illustrate sectional views of an exterior surface of a blade member illustrated in FIG. 1 of the present invention.
Figure 3B:
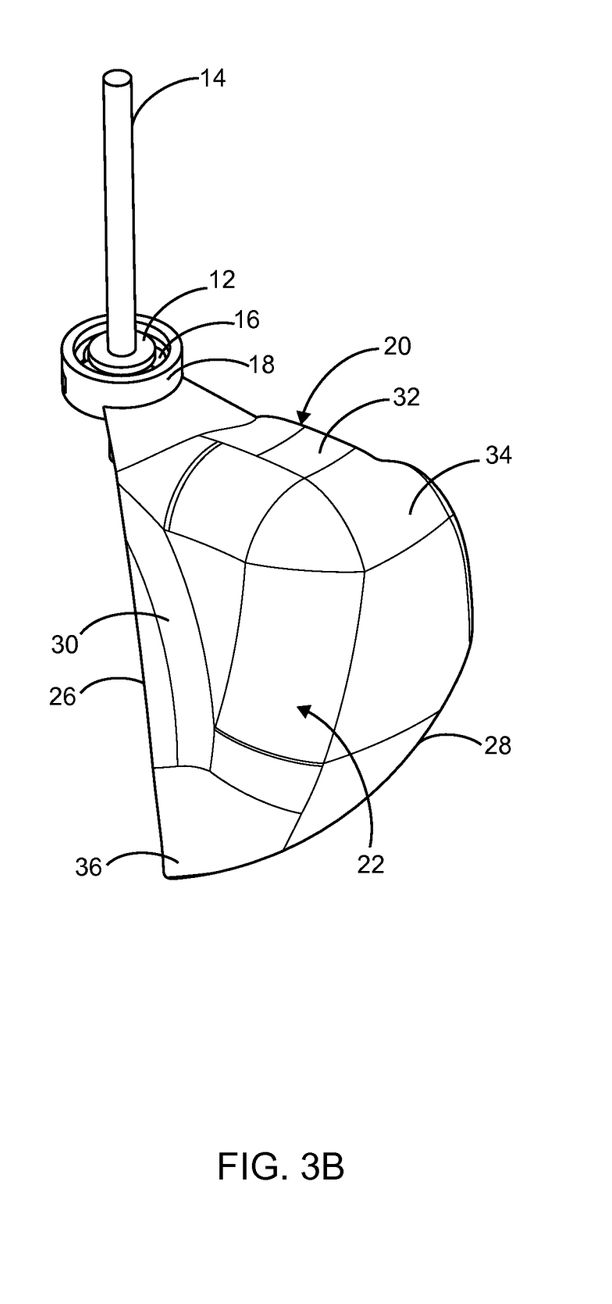
Figure 3C:
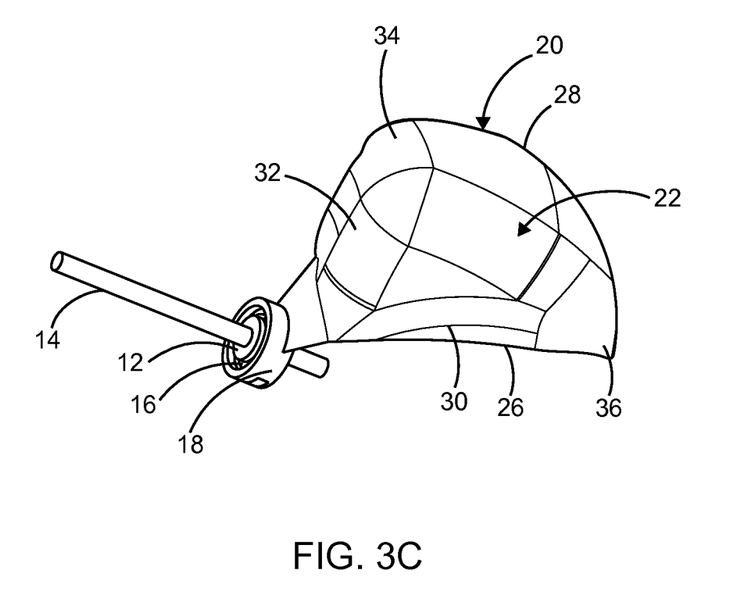

FIGS. 3A-3C illustrate sectional views of an exterior surface of a blade member illustrated in FIG. 1 of the present invention. A velocity vector imparting on the flat surface of the second region 32 results in high pressure level wherein the velocity imparting on the curved surface of the first region 30 results in low pressure level with high velocity flow. The high pressure level on the flat surface of the second region 32 causes the uni-directional axial turbine blade assembly 10 to rotate towards the first region 30 with lower pressure level. The curved surface of the first region 30 along the straight leading edge 26 flips up along the entire length of the straight leading edge 26.

Figure 3D:
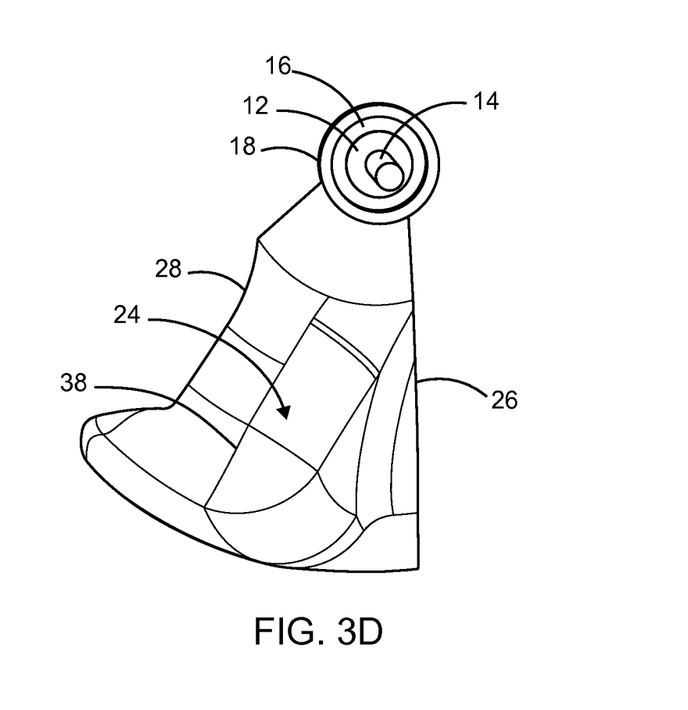
FIG. 3D illustrates sectional view of an interior surface of a blade member illustrated in FIG. 2 of the present invention.

FIG. 3D illustrates sectional view of an interior surface of a blade member illustrated in FIG. 2 of the present invention. A vector imparting on the concave surface of the third region 38 with the fluid flow in the reverse direction, a part of the flow of fluid will move to equidistant space between the plurality of blade members 20. The pressure in the third region 38 is greater than that in the space between the plurality of blade members 20. The high pressure results in a force affecting the interior surface 24 which causes the uni-directional axial turbine blade assembly 10 to move away from the space between the plurality of blade members 20.

The curved surface of the first region 30 along the straight leading edge 26, the flat surface of the second region 32 along the curved trailing edge 28 and the concave surface of the third region 38 proximate the trailing edge 28 of each of the plurality of blade members 20 oriented in relation to the central disc member 12 renders the formation of a unique blade configuration that facilitates uni-directional rotation of the uni-directional axial turbine blade assembly 10 irrespective of changes in flow direction of fluid. The uni-directional axial turbine blade assembly 10 can be used in case where the speed of fluid flow and the rotational velocity of the uni-directional axial turbine blade assembly 10 are desirable regardless of the change in flow direction.

In the preferred embodiment, each of the plurality of blade members 20 is manufactured with the straight leading edge 26 on right side of each of the plurality of blade members 20 of the uni-directional axial turbine fluid assembly 40. Thus, the uni-directional axial turbine blade assembly 10 in accordance with the preferred embodiment achieves a counter-clockwise spinning from either direction.

When the unidirectional axial turbine blade assembly 10 is connected to the elongated shaft 14 and rotates in same direction along the axis of rotation with any fluids or air, the unidirectional axial turbine blade assembly 10 can be used in generators, turbines which work by air/wind, sea waves and floating turbines and speed wind gauges/anemometers.

When the elongated shaft 14 is connected to the unidirectional axial turbine blade assembly 10 and the elongated shaft 14 turns the unidirectional axial turbine blade assembly 10, the unidirectional axial turbine blade assembly 10 can be used for subsonic and supersonic airplanes, propellers used for submarines, pumps, aerospace industries, and any industry involving rotation devices. The unidirectional axial turbine blade assembly 10 also has domestic uses in devices such as blenders.

Figure 4A:
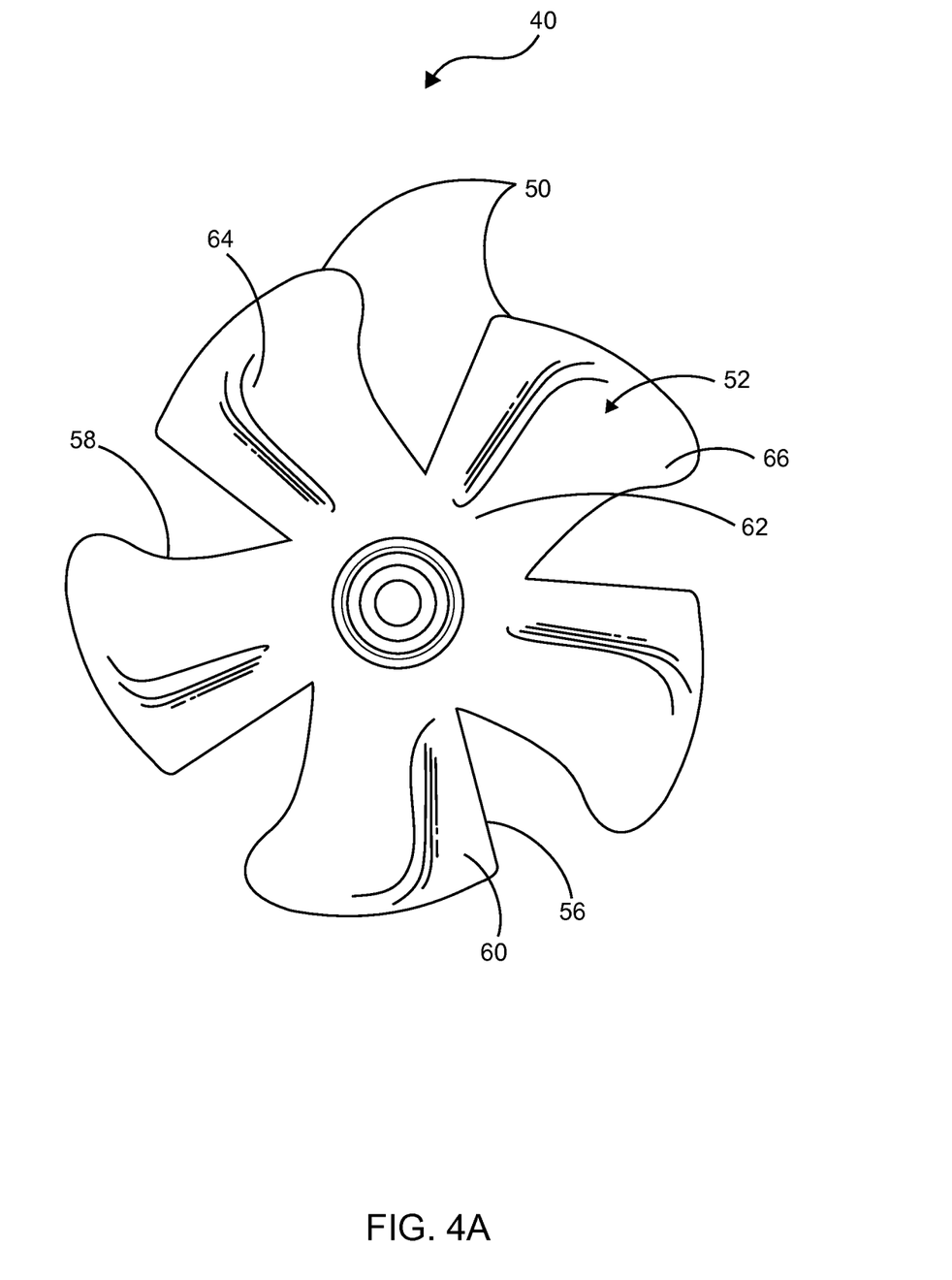
FIG. 4A is an exterior perspective view of one embodiment of the uni-directional axial turbine blade assembly of the present invention.
Figure 4B:
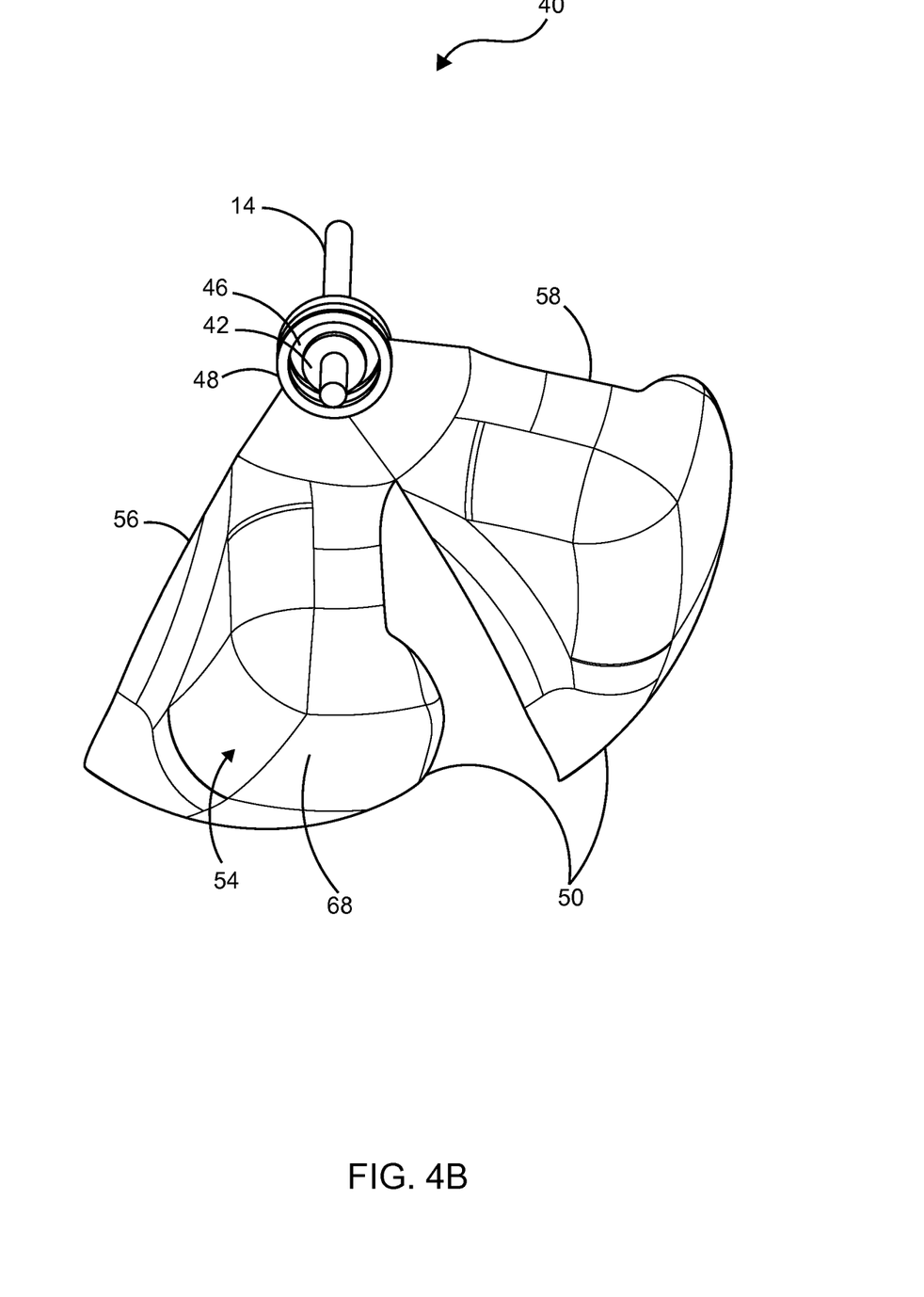
FIG. 4B is a sectional view of an interior surface of the blade member illustrated in FIG. 4A is attached with an elongated shaft.

FIG. 4A is an exterior perspective view of one embodiment of the uni-directional axial turbine blade assembly of the present invention. A uni-directional axial turbine blade assembly 40 in this embodiment is similar to that of the embodiment described in FIG. 1, except have different blade designs. The uni-directional axial turbine blade assembly 40 illustrated in FIG. 4A is a flip reverse design of the uni-directional axial turbine blade assembly 10 illustrated in FIG. 1. As shown in FIG. 4B, a sectional view of an interior surface of the blade member shown in FIG. 4A is illustrated. The uni-directional axial turbine blade assembly 40 comprises a central disc member 42 coupled to an elongated shaft 14 of a motor or generator (not shown), a rotational support member 46 mounted on outer circumference of the central disc member 42, an outer ring 48 mounted on outer circumference of the rotational support member 46 and a plurality of blade members 50 spaced equidistantly, extending radially outward from the outer ring 48. The central disc member 42 is coupled to the elongated shaft 14 at a central axis of rotation. The rotational support member 46 and the outer ring 48 are oriented coaxially with the central disc member 42.

Each of the plurality of blade members 50 includes an exterior surface 52, an interior surface 54 (FIG. 4B), a leading edge 56 and a trailing edge 58. The leading edge 56 is straight and the trailing edge 58 is curved. The exterior surface 52 includes a first region 60 having a curved surface along the leading edge 56 and a second region 62 having a flat surface along the trailing edge 58 and a convex surface 64 extending from the flat surface along the trailing edge 58 and terminating to a radially inward portion 66. The flat surface of the second region 62 is attached to the outer ring 48 proximate the central disc member 42. The interior surface 54 of each of the plurality of blade members 50 includes a third region 68 having a concave surface proximate the trailing edge 58. The rotational support member 46 is selected from a group consisting of a flange with holes.

The curved surface of the first region 60 along the straight leading edge 56, the flat surface of the second region 62 along the curved trailing edge 58 and the concave surface of the third region 68 proximate the trailing edge 58 of each of the plurality of blade members 50 oriented in relation to the central disc member 42 renders the formation of a unique blade configuration that facilitates uni-directional rotation of the uni-directional axial turbine blade assembly 40 irrespective of changes in flow direction of fluid. The uni-directional axial turbine blade assembly 40 can be used in case where the speed of fluid flow and the rotational velocity of the uni-directional axial turbine blade assembly 40 are desirable regardless of the change in flow direction.

In this embodiment, each of the plurality of blade members 50 is manufactured with the straight leading edge 56 on left side of each of the plurality of blade members 50 of the uni-directional axial turbine fluid assembly 40 by flip reversing the uni-directional axial turbine blade assembly 10. Thus, the uni-directional axial turbine blade assembly 40 in accordance with this embodiment achieves a clockwise spinning from either direction.

Figure 5A:
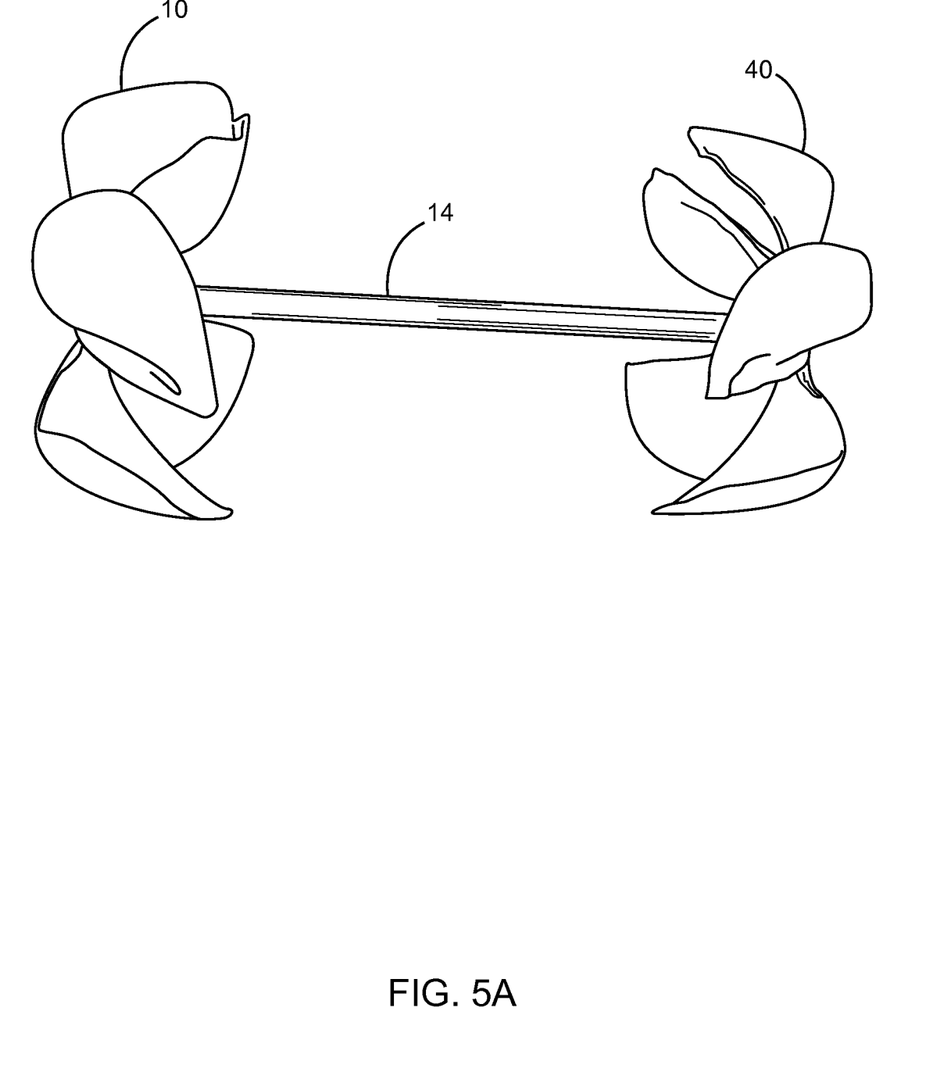
FIG. 5A is a perspective view of another embodiment of the present invention, illustrating two separate uni-directional axial turbine blade assemblies illustrated in FIGS. 1 and 4A are attached to an elongated shaft on both ends thereof respectively.

FIG. 5A is a perspective view of another embodiment of the present invention, illustrating two separate uni-directional axial turbine blade assemblies 10 and 40 illustrated in FIGS. 1 and 4A are attached to the elongated shaft 14 on both ends thereof respectively. The uni-directional axial turbine blade assemblies 10 and 40 are joined back to back and spaced apart with the elongated shaft 14, in such a way that the concave surface of the third region 38 of the unidirectional axial turbine blade assembly 10 facing with the concave surface of the third region 68 of the unidirectional axial turbine blade assembly 40 and the convex surfaces 34 and 64 of the unidirectional axial turbine blade assemblies 10 and 40 facing upwards.

Figure 5B:
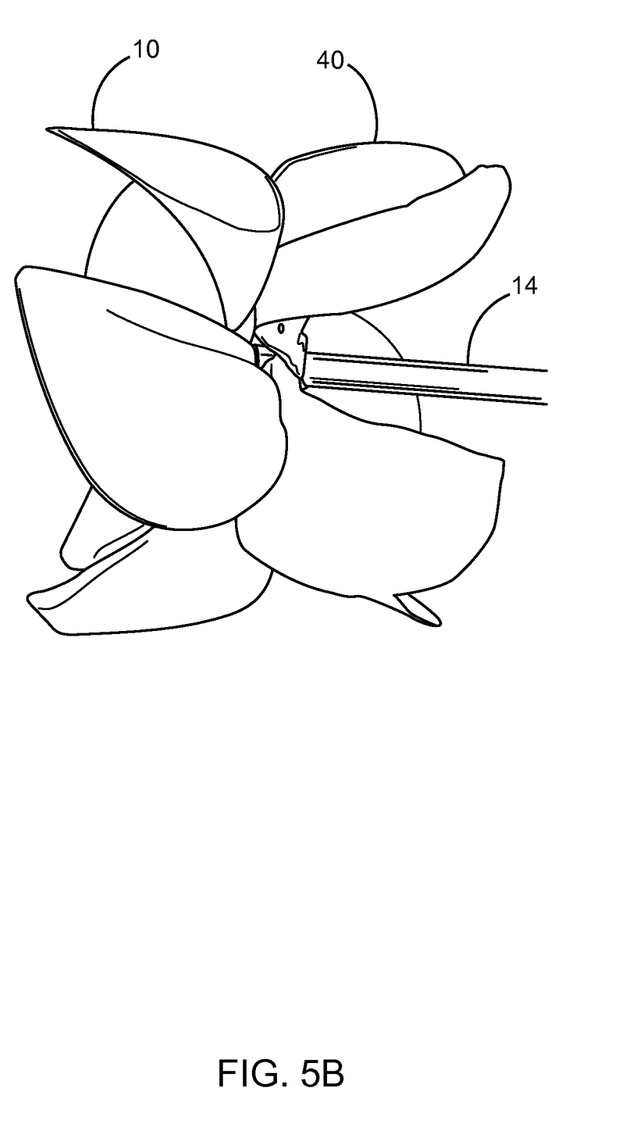
FIG. 5B is a perspective view of yet another embodiment of the present invention, illustrating two separate uni-directional axial turbine blade assemblies illustrated in FIGS. 1 and 4A are joined together and attached to the elongated shaft on at least one end thereof.

FIG. 5B is a perspective view of yet another embodiment of the present invention, illustrating two separate uni-directional axial turbine blade assemblies 10 and 40 illustrated in FIGS. 1 and 4A are joined together and attached to the elongated shaft 14 on at least one end thereof. The uni-directional axial turbine blade assembly 10 is joined together with the unidirectional axial turbine blade assembly 40 on either/both sides of the elongated shaft 14, in such a way that the convex surface 34 of the unidirectional axial turbine blade assembly 10 facing the convex surface 64 of the unidirectional axial turbine blade assembly 40. When any air or liquid is passed through the uni-directional axial turbine blade assemblies 10 and 40 from one direction, both the uni-directional axial turbine blade assemblies 10 and 40 will spin in the same direction causing the elongated shaft 14 to spin with more power than usual. This embodiment works with fluid or air agitation/turbulence (coming from various directions), and does not require a protective tunnel or duct.

While a particular form of the invention has been illustrated and described, it will be apparent that various modifications can be made without departing from the spirit and scope of the invention. For example, the uni-directional axial turbine blade assembly 10 may include various designs and configurations for blade members 20 to achieve efficient uni-directional rotation. Accordingly, it is not intended that the invention be limited, except as by the appended claims.

What is claimed is:

1. An axial turbine blade assembly for propellers, the axial turbine blade assembly comprising: a central disc member coupled to an elongated shaft of a motor or generator; a rotational support member mounted on outer circumference of the central disc member; an outer ring mounted on outer circumference of the rotational support member; and a plurality of blade members extending radially outward from the outer ring, each of the plurality of blade members having an exterior surface, an interior surface, a leading edge and a trailing edge; the exterior surface includes a first region having a curved surface along the leading edge, a second region having a flat surface along the trailing edge, the flat surface being attached proximate the central disc member and a convex surface extending from the flat surface along the trailing edge and terminating to a radially inward portion; and the interior surface includes a third region having a concave surface proximate the trailing edge; whereby the curved surface along the leading edge, the flat surface along the trailing edge and the concave surface proximate the trailing edge of each of the plurality of blade members oriented in relation to the central disc member renders the formation of a unique blade configuration that facilitates uni-directional rotation of the axial turbine blade assembly irrespective of changes in flow direction of fluid.

2. The axial turbine blade assembly of claim 1 wherein the central disc member is coupled to the elongated shaft at a central axis of rotation.

3. The axial turbine blade assembly of claim 1 wherein the plurality of blade members are equidistantly spaced relative to each other.

4. The axial turbine blade assembly of claim 1 wherein the leading edge is straight and the trailing edge is curved.

5. The axial turbine blade assembly of claim 1 wherein the rotational support member and the outer ring are oriented coaxially with the central disc member.

6. The axial turbine blade assembly of claim 1 wherein the radially inward portion is extended transverse to axial flow of fluid and axially parallel to the central axis of rotation to define a pocket like structure.

7. The axial turbine blade assembly of claim 1 wherein the axial turbine blade assembly is used for various purposes selected from a group consisting of: generators, turbines which work by aft/wind, sea waves and floating turbines, speed wind gauges/anemometers, subsonic or supersonic airplanes, propellers used for submarines, pumps, aerospace industries, and any industry involving rotation devices.

8. The axial turbine blade assembly of claim 1 wherein the rotational support member is selected from a group consisting of a flange.

9. A uni-directional axial turbine blade assembly, comprising:
   a central disc member coupled to an elongated shaft of a motor or generator, the central disc member defining a central axis of rotation;
   a rotational support member mounted on outer circumference of the central disc member;
   an outer ring mounted on outer circumference of the rotational support member; and
   a plurality of blade members spaced equidistantly, extending radially outward from the outer ring, each of the plurality of blade members having an exterior surface, an interior surface, a leading edge that being straight and a trailing edge that being curved;
   the exterior surface that includes a first region having a curved surface along the straight leading edge, a second region having a flat surface along the trailing edge, the flat surface being attached proximate the central disc member and a convex surface extending from the flat surface along the trailing edge and terminating to a radially inward portion; and
   the interior surface that includes a third region having a concave surface proximate the trailing edge;
   whereby the curved surface along the straight leading edge, the flat surface along the curved trailing edge and the concave surface proximate the trailing edge of each of the plurality of blade members oriented in relation to the central disc member renders the formation of a unique blade configuration that facilitates uni-directional rotation of the uni-directional axial turbine blade assembly irrespective of changes in flow direction of fluid.

10. The uni-directional axial turbine blade assembly of claim 9 wherein the curved surface along the straight leading edge flips up along the entire length of the straight leading edge.

11. The uni-directional axial turbine blade assembly of claim 9 wherein the radially inward portion is extended transverse to axial flow of fluid and axially parallel to the central axis of rotation to define a pocket like structure.

12. The uni-directional axial turbine blade assembly of claim 9 wherein the flat surface of the second region having a high pressure level causes the uni-directional axial turbine blade assembly to rotate towards the first region having a low pressure level.

13. The uni-directional axial turbine blade assembly of claim 9 wherein the concave surface of the third region having a high pressure level causes the uni-directional axial turbine blade assembly to move away from the equidistant space having a low pressure level between the plurality of blade members.

14. The uni-directional axial turbine blade assembly of claim 9 wherein the rotational support member is selected from a group consisting of a flange.

15. The uni-directional axial turbine blade assembly of claim 9 wherein the uni-directional axial turbine blade assembly is used for various purposes selected from a group including but not limited to: generators, turbines which work by air/wind, sea waves and floating turbines, speed wind gauges/anemometers, subsonic and supersonic airplanes, propellers used for submarines, pumps, aerospace industries, and any industry involving rotation devices.

16. A uni-directional axial turbine blade assembly for a propeller having a central disc member coupled to an elongated shaft, a rotational support member mounted on outer circumference of the central disc member, an outer ring mounted on outer circumference of the rotational support member, and a plurality of blade members having an exterior surface, an interior surface, a leading edge and a trailing edge, the plurality of blade members spaced equidistantly, extending radially outward from the outer ring to which the elongated shaft is formed at a central axis of rotation, each of the plurality of blade members comprising:
   a first region on the exterior surface, the first region having a curved surface along the leading edge;
   a second region on the exterior surface, the second region having a flat surface along the trailing edge, the flat surface being attached proximate the central disc member;
   a convex surface extending from the flat surface along the trailing edge;
   a radially inward portion extending from the convex surface along the trailing edge; and
   a third region on the interior surface, the third region having a concave surface proximate the trailing edge;
   whereby the curved surface along the leading edge, the flat surface along the trailing edge and the concave surface proximate the trailing edge of each of the plurality of blade members oriented in relation to the central disc member renders the formation of a unique blade configuration that facilitates uni-directional rotation of the axial turbine blade assembly irrespective of changes in flow direction of fluid.

17. The uni-directional axial turbine blade assembly of claim 16 wherein the leading edge is straight and the trailing edge is curved.

18. The uni-directional axial turbine blade assembly of claim 16 wherein the radially inward portion is arranged transverse to axial flow of fluid and axially parallel to the central axis of rotation to define a pocket like structure.

19. The uni-directional axial turbine blade assembly of claim 16 wherein the uni-directional axial turbine blade assembly achieves a counter-clockwise spinning from either direction when manufactured with the straight leading edge on right side of each of the plurality of blade members of the uni-directional axial turbine blade assembly.

20. The uni-directional axial turbine blade assembly of claim 16 wherein the uni-directional axial turbine blade assembly achieves a clockwise spinning from either direction when manufactured with the straight leading edge on left side of each of the plurality of blade members of the uni-directional axial turbine blade assembly by flip reversing the uni-directional axial turbine blade assembly.

* * * * *